Patented Apr. 7, 1953

2,634,270

UNITED STATES PATENT OFFICE 2,634,270

TRIAZINE PHOSPHORUS COMPOUNDS

Morris L. Nielsen, Dayton, Ohio, assignor to Monsanto Chemical Company, St. Louis, Mo., a corporation of Delaware No Drawing. Application December 29, 1950, Serial No. 203,555

7 Claims. (Cl. 260—249.8)

This invention relates to new compositions of matter and the manner of producing them. The invention relates specifically to certain insoluble compositions containing carbon, nitrogen and phosphorus.

It is an object of the invention to provide the new compounds ammelino phosphoryl dichloride and ammelino phosphoryl diamide. It is likewise an object of the invention to provide compositions of matter in which nitrogen and phosphorus are provided in a stable chemical composition characterized by substantial insolubility in water. This invention provides ammeline derivatives containing chemically combined phosphorus, which derivatives have the structure:

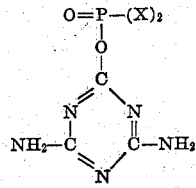

where X is a radical selected from the group consisting of —Cl, —OH and —NH₂. The present compounds are obtained by reacting ammeline with phosphorus oxychloride.

Condensation products of ammonia with various compounds of phosphorus have been known in the past, although the products which have been obtained did not satisfy the criterion as to an insoluble product which could remain in contact with water without leaching away. For example, it is desirable in the flameproofing of textile fabrics to apply a chemical compound which will supply nitrogen and phosphorus to the combustible fibers in a form insoluble in water to resist washing and weathering. The various inorganic phosphorus salts are therefore generally disadvantageous, as are the salts formed by melamine with acids since such compounds are generally soluble in water so that they are readily washed out of a fabric.

It has now been discovered that a water-insoluble phosphorus-containing triazine composition may be obtained as the compound ammelino phosphoryl dichloride obtained by the reaction of ammeline and phosphorus oxychloride. The resulting material is clearly not a phosphate, but is instead a new compound which is generally insoluble in organic and inorganic solvents. Even strong acids do not dissolve this substance, short of extensively decomposing the material.

It has also been found that ammelino phosphoryl dichloride may be reacted with ammonia to give ammelino phosphoryl diamide. This reaction may be carried out at room temperature or at elevated temperatures in the presence of anhydrous or aqueous ammonia.

In a specific embodiment of the process of the present invention to produce the novel composition, the following examples illustrate the details of the process.

Example 1

The compound ammelino phosphoryl dichloride was produced by mixing 0.5 gm. mole of ammeline with one gm. mole of phosphorus oxychloride. The mixture of these components was heated at refluxing temperature in a reaction flask provided with a stirrer. The reaction mixture was then cooled and was washed with benzene to remove unreacted phosphorus oxychloride. The remaining crude product was dried for an hour under vacuum to give 95 g. of a powdery material. The product was insoluble in water and appeared to have a structure corresponding to a mono-phosphorylation as is shown in the formula below:

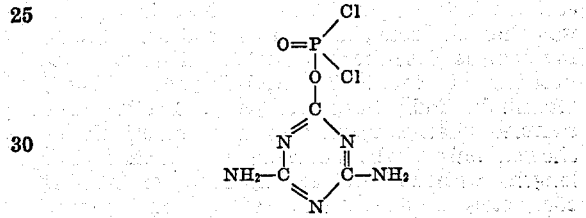

The material was found to be amorphous without any evidence of crystallinity.

In general, the composition of matter resulting from the above reaction of ammeline and phosphorus oxychloride may be prepared by the thermal reaction of these two components. It has been found that at least one mole of phosphorus oxychloride may be used for each mole of ammeline. Such mixtures in the above range of proportions of the two ingredients may be blended together and the mixture may then be added at a reflux temperature of about 108° in order to carry out the reaction. In general, the temperature is not critical, although the range of 100–200° C. is preferred. The time of reaction is not critical, as a satisfactory product is obtained when the reactants are maintained at a reflux temperature for a period sufficient to permit completion of the reaction which may be approximately 2–6 hours. The reaction may be carried out at atmospheric pressure, such as in open vessels, or under pressure in an autoclave. A variation of the above process may be carried out by conducting the reaction in an organic solvent for phosphoryl chloride, e. g., benzene or kerosene.

Example 2

The ammelino phosphoryl dichloride obtained by the above process was treated with liquid ammonia in a pressure vessel at room temperature. The two components were left together for a day, after which the vessel was opened. It was found that the new product obtained in substantial yield was ammelino phosphoryl diamide

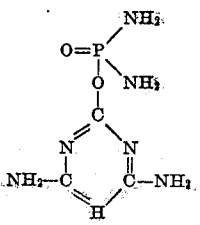

This compound was also insoluble in water and organic solvents generally. The product was obtained as a white powder which could be suspended in water.

The compositions obtained by the above processes of Examples 1 and 2 may be used as a fertilizer ingredient. In this relationship it is of value because of its high concentration of nitrogen and phosphorus which, in the form of the substantially insoluble complex are made slowly available to plant growth.

Example 3

The use of the above ammelino phosphoryl dichloride derived from ammeline and phosphorus oxychloride is shown as a flameproofing composition in this example. A sheeting grade cotton was treated by applying a water suspension of the reaction product of ammeline and phosphorus oxychloride. An add-on of 15% by weight of the solid material was obtained. The treated cotton fabric was then dried. The dried sample was then subjected to the standard flameproofing test as described in R. W. Little, "Flameproofing of Textile Materials," pages 111-115 (Reinhold Publishing Company, 1947). The sample, when subjected to a standard flame, showed only slight charring (6.5 inches char length) without bursting into flame or burning completely as does an untreated sample. The treatment may also be applied directly by sprinkling the powder upon the cloth or by utilizing non-aqueous suspensions, if desired.

Example 4

Ammelino phosphoryl diamide was subjected to the same test as described in Example 3. The test sample of cotton sheeting showed a char length of 6.0 inches, showing that the treated sample resisted burning.

The above compositions of the present invention are obtained as a white to grey-colored powder which may also be employed as a delusterant in the fabric of certain resins and plastic materials. Since the products are amorphous, they may be readily blended and combined with other ingredients to provide a smooth composition free from roughness, such as would otherwise result in the employment of roughly crystalline materials.

Example 5

Another new compound which can be prepared from the chloride of Example 1 is ammelino phosphoric acid

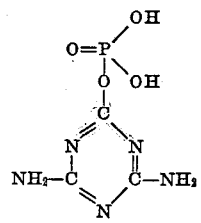

This compound can be prepared by hydrolyzing ammelino phosphoryl dichloride, such as by prolonged boiling or by treatment with dilute alkali. The latter may be an aqueous solution of sodium or potassium carbonate or hydroxide. The alkali treatment is preferably followed by acidification to obtain the acid. The ammelino phosphoric acid is moderately water-soluble.

Although the specific examples illustrate the reaction of ammeline, which is a mono-hydroxy compound, it is also within the scope of the invention to react ammelide with phosphorus oxychloride. Ammelide is a dihydroxy compound which is called 6-amino-s-triazine-2,4-diol.

Having now described certain specific forms of the invention, it is to be understood that the invention is not to be limited to the specific forms or compositions herein described or specifically covered by the claims.

What is claimed and is desired to be protected by Letters Patent of the United States is:

1. Ammelino phosphoryl dichloride

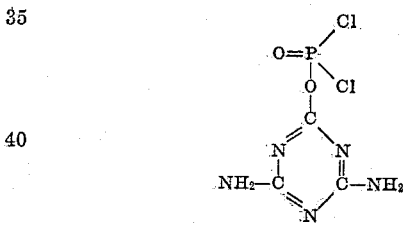

2. The process for manufacturing ammelino phosphoryl chloride having the formula:

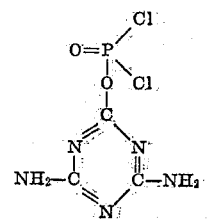

from ammeline and phosphorus oxychloride which comprises heating together a mixture of ammeline and phosphorus oxychloride.

3. The process of manufacturing ammeline phosphoryl chloride having the formula:

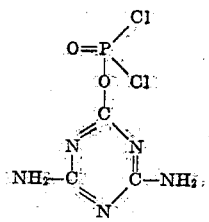

which comprises heating together 1 to 2 moles of phosphorus oxychloride and one mole of ammeline to a temperature in the range of 100° C. to 200° C.

4. The process of manufacturing ammeline phosphoryl chloride having the formula:

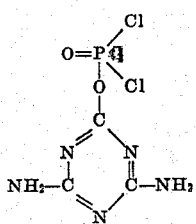

which comprises heating a mixture of 3 moles of phosphorus oxychloride and one mole of ammeline to a temperature corresponding to the boiling point of the said mixture.

5. Ammelino phosphoryl diamide

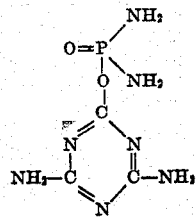

6. The process of manufacturing ammelino phosphoryl diamide having the formula:

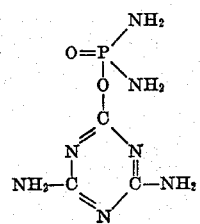

contacting of ammelino phosphoryl dichloride with ammonia.

7. Ammeline substitution products having the composition:

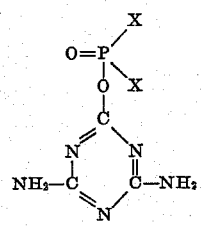

where X is a radical selected from the group consisting of —Cl and —NH₂ radicals.

MORRIS L. NIELSEN.

No references cited.